(12) United States Patent
Taniguchi et al.

(10) Patent No.: US 7,454,589 B2
(45) Date of Patent: Nov. 18, 2008

(54) DATA BUFFER CIRCUIT, INTERFACE CIRCUIT AND CONTROL METHOD THEREFOR

(75) Inventors: Kazuya Taniguchi, Kasugai (JP); Toshiyuki Nishii, Kasugai (JP); Hiromichi Mizuno, Kasugai (JP); Tsutomu Terazawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 11/102,656

(22) Filed: Apr. 11, 2005

(65) Prior Publication Data

US 2006/0129720 A1    Jun. 15, 2006

(30) Foreign Application Priority Data

Dec. 9, 2004    (JP) ............................. 2004-357165

(51) Int. Cl.
    *G06F 1/12*    (2006.01)
(52) U.S. Cl. ........................ 711/200; 326/93; 326/94; 326/95; 326/96; 326/97; 326/98; 710/52; 710/58; 711/167; 711/217; 711/218; 711/219; 713/400; 713/401
(58) Field of Classification Search .................. None
    See application file for complete search history.

(56) References Cited

U.S. PATENT DOCUMENTS 5,978,891 A * 11/1999 Takeda ........................ 711/167

2002/0023238 A1 * 2/2002 Yamada et al. ............... 713/400

FOREIGN PATENT DOCUMENTS

| JP | 05-073510 | 3/1993 |
|----|-----------|--------|
| JP | 05-224920 | 9/1993 |
| JP | 8-511384 | 11/1996 |
| JP | 2000-305895 | 11/2000 |
| JP | 2001-319227 | 11/2001 |

* cited by examiner

*Primary Examiner*—Kevin Ellis
*Assistant Examiner*—Alan M Otto
(74) *Attorney, Agent, or Firm*—Arent Fox LLP

(57) ABSTRACT

There are provided a buffer circuit buffers data between a synchronous circuit and an asynchronous circuit, and a control method therefor. There are also provided an interface circuit that controls data transfer between a synchronous memory circuit and the asynchronous circuit, and a control method therefor, which are used in the buffer circuit and the control method therefor. A data buffer circuit that is interposed between an image processing system and a main system includes a one-port RAM, a control signal generating section, an subsequent cycle address generating section, and a first selector. The first selector selectively outputs the present cycle address to an address of the one-port RAM when an access to the one-port RAM is a write access, and selectively outputs the subsequent cycle address to the address of the one-port RAM when the access to the one-port RAM is a read access.

17 Claims, 11 Drawing Sheets

BLOCK DIAGRAM OF OVERALL SYSTEM ACCORDING TO FIRST TO THIRD EMBODIMENTS

BLOCK DIAGRAM OF OVERALL SYSTEM ACCORDING TO FIRST TO THIRD EMBODIMENTS

FIG.2 BLOCK DIAGRAM OF CIRCUIT STRUCTURE ACCORDING TO FIRST EMBODIMENT

FIG.3 CIRCUIT DIAGRAM OF SUBSEQUENT CYCLE ADDRESS GENERATING SECTION

FIG.4 CIRCUIT DIAGRAM OF CONTROL SIGNAL GENERATING SECTION

EXPLANATORY DIAGRAM OF ADDRESS ARRANGEMENT

FIG. 6 DIAGRAM OF OPERATION WAVEFORMS ACCORDING TO FIRST EMBODIMENT

FIG.7 BLOCK DIAGRAM OF CIRCUIT STRUCTURE ACCORDING TO SECOND EMBODIMENT

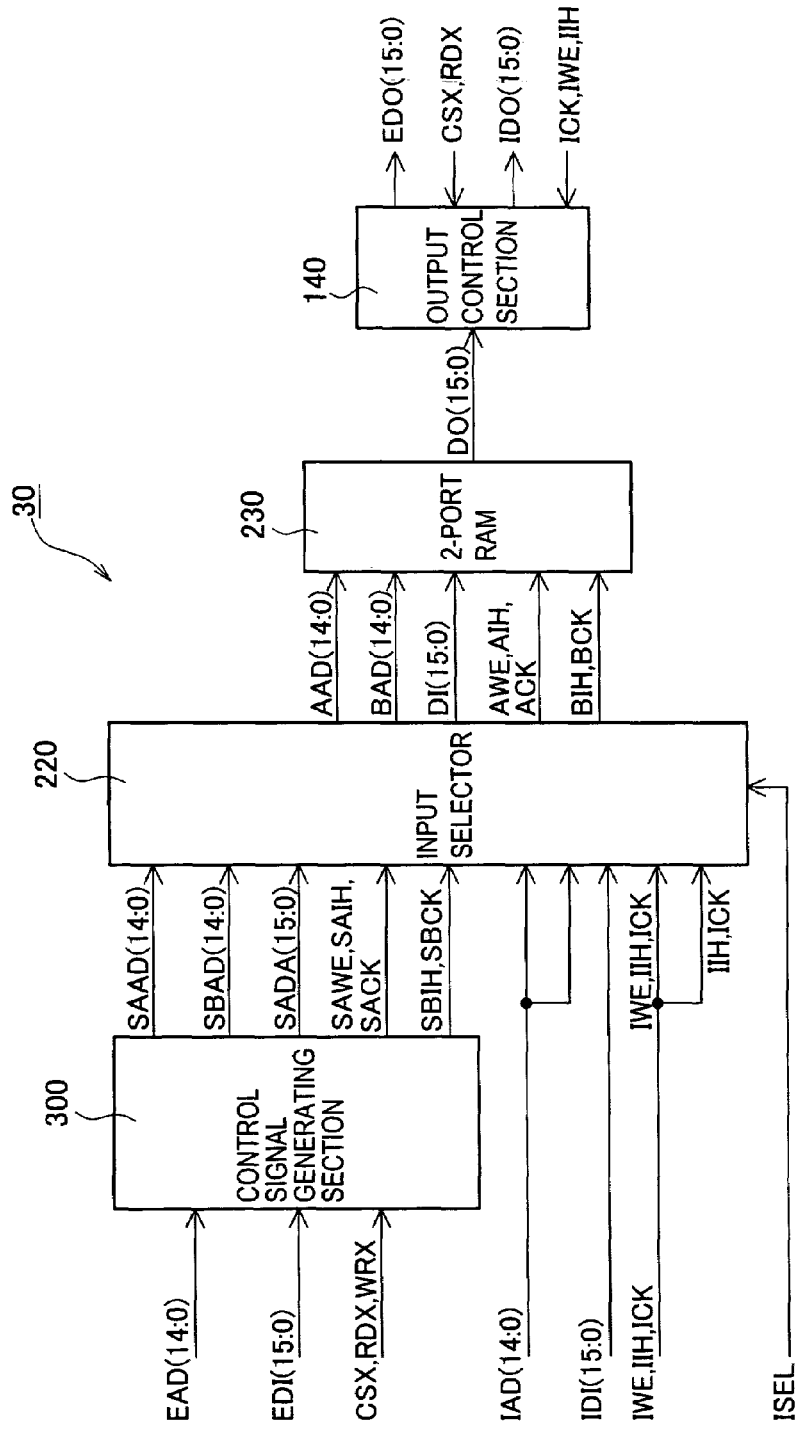
FIG.10 BLOCK DIAGRAM OF CIRCUIT STRUCTURE ACCORDING TO THIRD EMBODIMENT

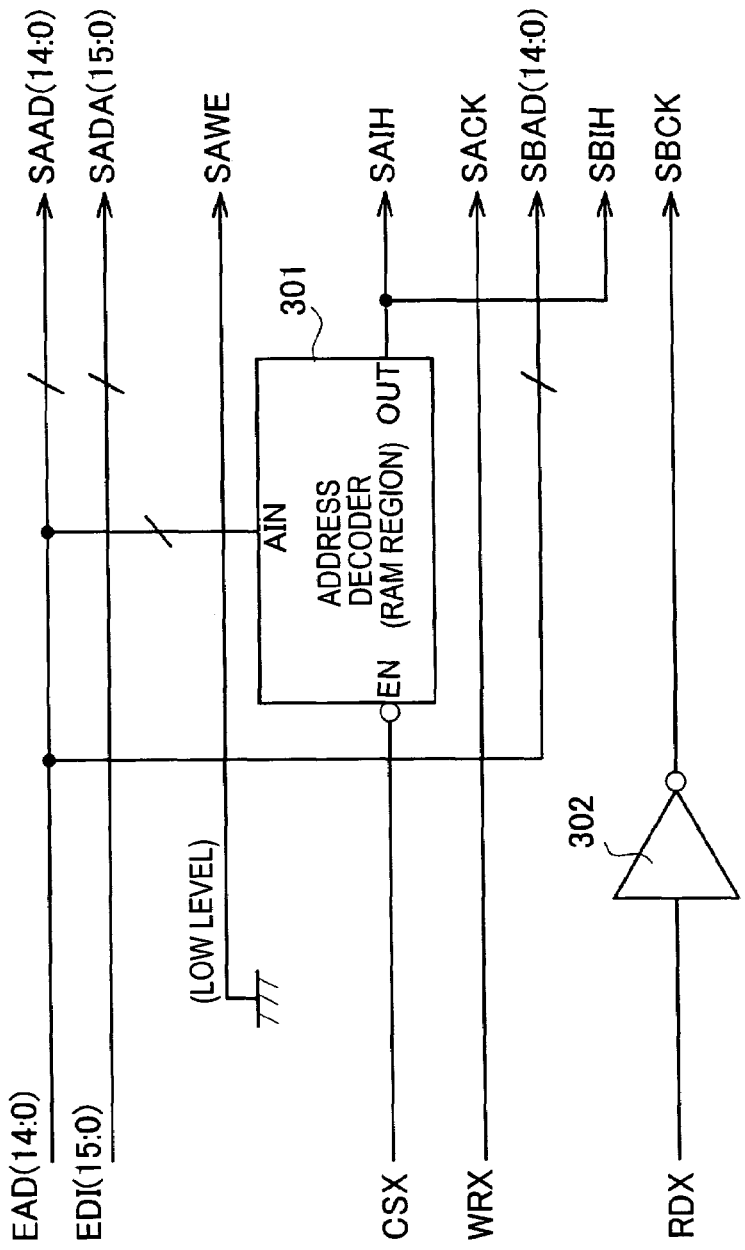
FIG.11 CIRCUIT DIAGRAM OF CONTROL SIGNAL GENERATING SECTION

DATA BUFFER CIRCUIT, INTERFACE CIRCUIT AND CONTROL METHOD THEREFOR

CROSS-REFERENCE TO RELATED APPLICATIONS

This application is based upon and claims the benefit of priority from each of the prior Japanese Patent Application No. 2004-357165 filed on Dec. 9, 2004, the entire contents of which are incorporated herein by reference.

BACKGROUND OF THE INVENTION

Field of the Invention

The present invention relates to a buffer circuit that buffers data between a synchronous circuit and an asynchronous circuit, and a control method therefor. More particularly, the present invention relates to an interface circuit that conducts data transfer control between a synchronous memory circuit and an asynchronous circuit, and a control method therefor.

In a computer system, there is employed a circuit that buffers data between a synchronous circuit and an asynchronous circuit.

For example, an image processing system is made up of an image processing circuit that takes in a large amount of image data from a CCD sensor, and a system host that takes in the processed data. In the image processing system, the image processing circuit transfers processed data in synchronism with a clock signal. On the other hand, there is a system host that does not output a clock signal in order to reduce power consumption, reduce a noise or reduce the number of control signals. That is, in the system including the system host, the processed data is transferred by a control signal that is asynchronous with the clock. In this system, a buffer circuit is used in order to smoothly transfer data between an image processing circuit that is a synchronous circuit and a system host that is an asynchronous circuit.

In the case of transferring data between the synchronous circuit that operates in synchronization with the clock signal and the asynchronous circuit that operates out of synchronization with the clock signal, there has been proposed an asynchronous interface (buffer circuit) which is disclosed, for example, in Japanese Unexamined Patent publication No. 2000-305895.

The asynchronous interface is a circuit that controls data transfer between a circuit that is in synchronization with a first clock and another circuit that is in synchronization with a second clock. The asynchronous interface includes buffers of plural systems that are arranged in parallel, a selector that selects data stored in those buffers for each of the systems, and a synchronous signal generating unit that inputs the first clock and the second clock and generates a synchronous signal. In the asynchronous interface, the data transfer between the circuit that is in synchronization with the first clock and the circuit that is in synchronization with the second clock is conducted through the buffers of plural systems which are controlled according to the synchronous signal.

However, in the interface disclosed in the above publication '895, it is necessary to input the first clock and the second clock. For that reason, in the case of conducting data transfer between the synchronous circuit that transfers data in synchronization with the clock signal and the asynchronous circuit that transfers data according to only the control signal without outputting the clock signal as with the above-mentioned relationship between the image processing circuit and the system host, the interface disclosed in the above publication '895 cannot be employed.

Also, even if the system host outputs the clock signal, hand shake control using write request and request acknowledge is used for transfer control of data in the interface disclosed in the above publication '895. More specifically, when a CPU 2 disclosed in the above publication '895 continuously accesses to a memory 4, the CPU 2 does not conduct next write access until the CPU 2 outputs a write request 100 as well as data input 103, and a request acknowledge 102 is activated. In a system that continuously transfers a large amount of data as in the above-mentioned image processing system, there may occur a case in which write accessed processing catches up with a transfer request, and the CPU 2 becomes in a wait state until the request acknowledge is activated. The overhead in the wait state under the hand shake control may affect a processing time of the data transfer.

Also, in the case where the system host does not output the clock signal, there is proposed a generation interface that generates a clock signal with inputting a read control signal and a write control signal. For example, it is possible to generate a clock signal by ORing an activating period of the read control signal and the write control signal to provide the activating periods of the respective control signals as the activating periods.

The asynchronous circuit takes in the data in the activating period of the read control signal, and outputs the data in the activating period of the write control signal. Accordingly, a setup time and a hold time with respect to the data are determined on the basis of a time point at which the activating state changes to an inactivating state.

On the other hand, the synchronous circuit starts an output of the data in the read access and takes in the data in the write access according to a termination edge (hereinafter referred to also as "activating edge") of the activating period of the clock signal. Accordingly, the setup time and the hold time with respect to the data are determined on the basis of the activating edge.

In the clock signal that has been generated as described above, the time point at which the read control signal and the write control signal change from the activating state to the inactivating state coincides with the activating edge of the clock signal. For that reason, the clock signal satisfies the setup time and the hold time with respect to the data.

However, in the read access, the asynchronous circuit suffers from the following problems.

In the read access, the asynchronous circuit takes in the data that has been outputted from the synchronous circuit at the time point when the read control signal changes from the active state to the inactive state. On the other hand, the synchronous circuit does not output the updated data at that time point because the update of the data starts at the termination edge of the clock signal. For that reason, the asynchronous circuit cannot take in the updated data which is a problem.

In the write access, the data that is outputted from the asynchronous circuit side is decided at a timing where the write control signal changes from the active state to the inactive state. For that reason, the synchronous circuit can take in the decided data, which arises no problem.

The present invention has been made in view of the above problems, and therefore an object of the present invention is to provide a buffer circuit that buffers data between a synchronous circuit and an asynchronous circuit in a system that sequentially deals with a large amount of data particularly as in an image processing system, and a control method for the buffer circuit. Another object of the present invention is to provide an interface circuit that controls data transfer between the synchronous circuit and the asynchronous circuit, which is used for the buffer circuit and the control method, and a control method for the interface circuit.

SUMMARY OF THE INVENTION

Also, according to the first aspect of the present invention, there is provided a data buffer circuit which is interposed between a synchronous circuit and an asynchronous circuit that conducts a read access or a write access in an active period of a read control signal or a write control signal, and buffers data transfer between the synchronous circuit and the asynchronous circuit, the data buffer circuit comprising: an interface circuit that inputs a control signal of the asynchronous circuit and outputs a clock signal in response to the read control signal and the write control signal, and a synchronous memory circuit that conducts a data access in synchronization with the synchronous circuit and conducts the data access in synchronization with a clock signal that is outputted from the interface circuit. The interface circuit includes a clock signal generating section that generates the clock signal with the termination edges of the respective active periods in the read control signal and the write control signal as the active edges, an subsequent cycle address generating section that generates a present cycle address which is an address corresponding to an access from the asynchronous circuit and a subsequent cycle address which is an address of a subsequent access cycle of the present cycle address in the continuous access cycles to the synchronous circuit, and a first address selecting section that selects any one of the subsequent cycle address and the present cycle address as an address of the synchronous memory circuit according to an instruction from the asynchronous circuit. The first address selecting section selectively outputs the present cycle address in the case of the write access, and selectively outputs the subsequent cycle address in the case of the read access, in the access to the synchronous memory circuit.

The interface circuit of the present invention includes the subsequent cycle address generating section that outputs the subsequent cycle address, and the first address selecting section that selectively switches the address that is outputted to the synchronous circuit according to a kind of access in the case of conducting the continuous read address. Accordingly, in the case of conducting the continuous read address, the subsequent cycle address is outputted to the synchronous circuit instead of the present address, and the read access of the data of the subsequent cycle corresponding to the subsequent cycle address is conducted. For that reason, in the continuous read access, the data that is outputted at a timing when the read control signal changes from the active state to the inactive state is data updated by using the subsequent cycle address in the previous access cycle. That is, the data that is outputted from the synchronous circuit is data corresponding to the address that has been outputted from the asynchronous circuit in the present cycle.

For that reason, in the interface circuit of the present invention, in the case of conducting the continuous read access, the asynchronous circuit can take in correct data corresponding to the address in the present access cycle.

In the data buffer circuit of the present invention, the present cycle address used in the write access and the subsequent cycle address used in the read access are inputted to the individual address inputs of a synchronous dual port memory circuit, that is, the write address input and the read address input, respectively. For that reason, in the first aspect of the present invention, there is required no selector for switching the addresses in the write access and the read access which has been required in the first aspect of the present invention. For that reason, there can be provided a data buffer circuit which is simple in the circuit structure as compared with the first aspect of the present invention.

The data buffer circuit according to the present invention has the above-mentioned circuit structure. That is, in the read address, data starts to be updated at a time point when the read control signal transits from an inactive state to an active state. For that reason, the asynchronous circuit can take in the updated data at a time point when the read control signal transits from the active state to the inactive state.

Also, in the write access, because the decided data is outputted at a time point when the write control signal transits from the active state to the inactive state, the data can be written in the synchronous memory circuit.

For that reason, because the addresses that are inputted to the respective ports can be identical with each other, and a circuit for generating the addresses can be omitted, there can be provided a simpler data buffer circuit.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

The above and further objects and novel features of the invention will more fully appear from the following detailed description when the same is read in connection with the accompanying drawings. It is to be expressly understood, however, that the drawings are for the pur pose of illustration only and are not intended as a definition of the limits of the invention.

BRIEF DESCRIPTION OF THE DRAWINGS

FIG. 10 is a block diagram of circuit structure according to third embodiment.

FIG. 11 is a circuit diagram of control signal generating section according to third embodiment.

DETAILED DESCRIPTION OF THE PREFERRED EMBODIMENTS

A data buffer circuit and an interface circuit according to a first embodiment of the present invention will be described with reference to FIGS. 1 to 11.

Figure 1:
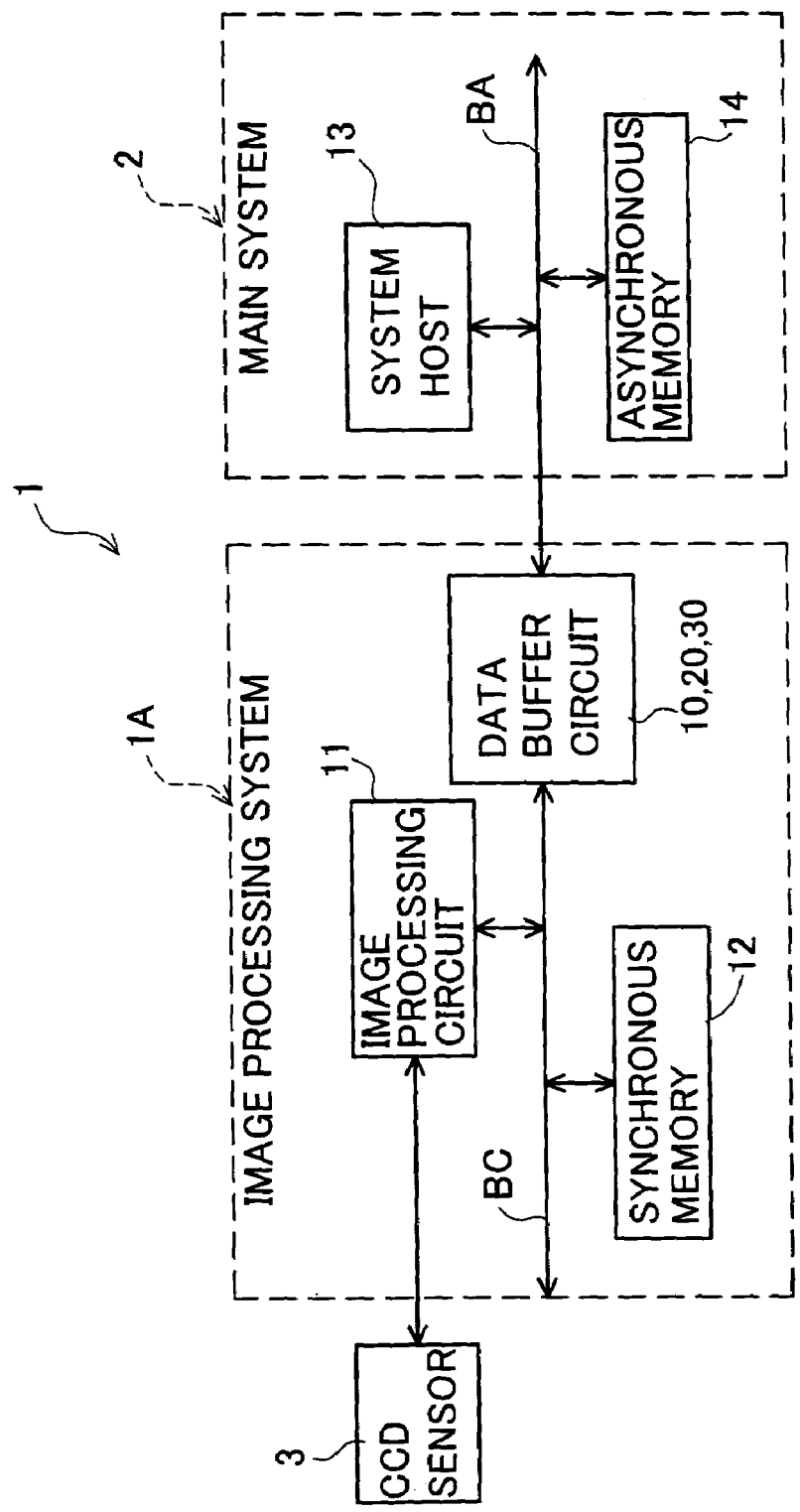
FIG. 1 is a block diagram of overall system according to first to third embodiments.

As an example of a device including a synchronous circuit that operates in synchronism with a clock signal, an asynchronous circuit that operates in asynchronism with the clock signal, and a data buffer circuit that is interposed between the synchronous circuit and the asynchronous circuit, an image input/output system 1 that takes in an image and processes the image, and displays or saves the image is shown in FIG. 1. The image input/output system 1 includes a CCD sensor 3 that takes in the image and outputs the image data, an image processing system 1A that image-processes the image data and outputs the image-processed data, and a main system 2 that displays or saves the processed data.

Among those components, the image processing system 1A includes an image processing circuit 11 that inputs the image data that is outputted from the CCD sensor 3, and conducts image processing such as image correction, a synchronous memory 12 that stores various parameters used for image processing and taken-in image data, and a data buffer circuit 10 that stores the processed data PD. Also, the image processing circuit 11, the synchronous memory 12 and the data buffer circuit 10 are connected to each other through a clock synchronous bus BC that is controlled according to a control signal synchronous with the clock signal CK.

Also, the main system 2 includes a system host 13 that is a CPU of a microcomputer, and an asynchronous memory 14 used for storing the processed data SD. Further, the system host 13 and the asynchronous memory 14 are connected to each other through a clock asynchronous bus BA that is controlled out of synchronization with the clock signal CK.

Also, the clock asynchronous bus BA, the data buffer circuit 10 and the clock synchronous bus BC are connected between the main system 2 and the image processing system 1A in the stated order. The data buffer circuit 10 controls the data transfer between the clock asynchronous bus BA and the clock synchronous bus BC. For that reason, the image processing system 1A can output the processed data PD that has been outputted to the clock synchronous bus BC to the clock asynchronous bus BA through the data buffer circuit 10. On the contrary, the image processing system 1A can output the data that has been outputted to the clock asynchronous bus BA to the clock synchronous bus BC through the data buffer circuit 10.

Figure 2:
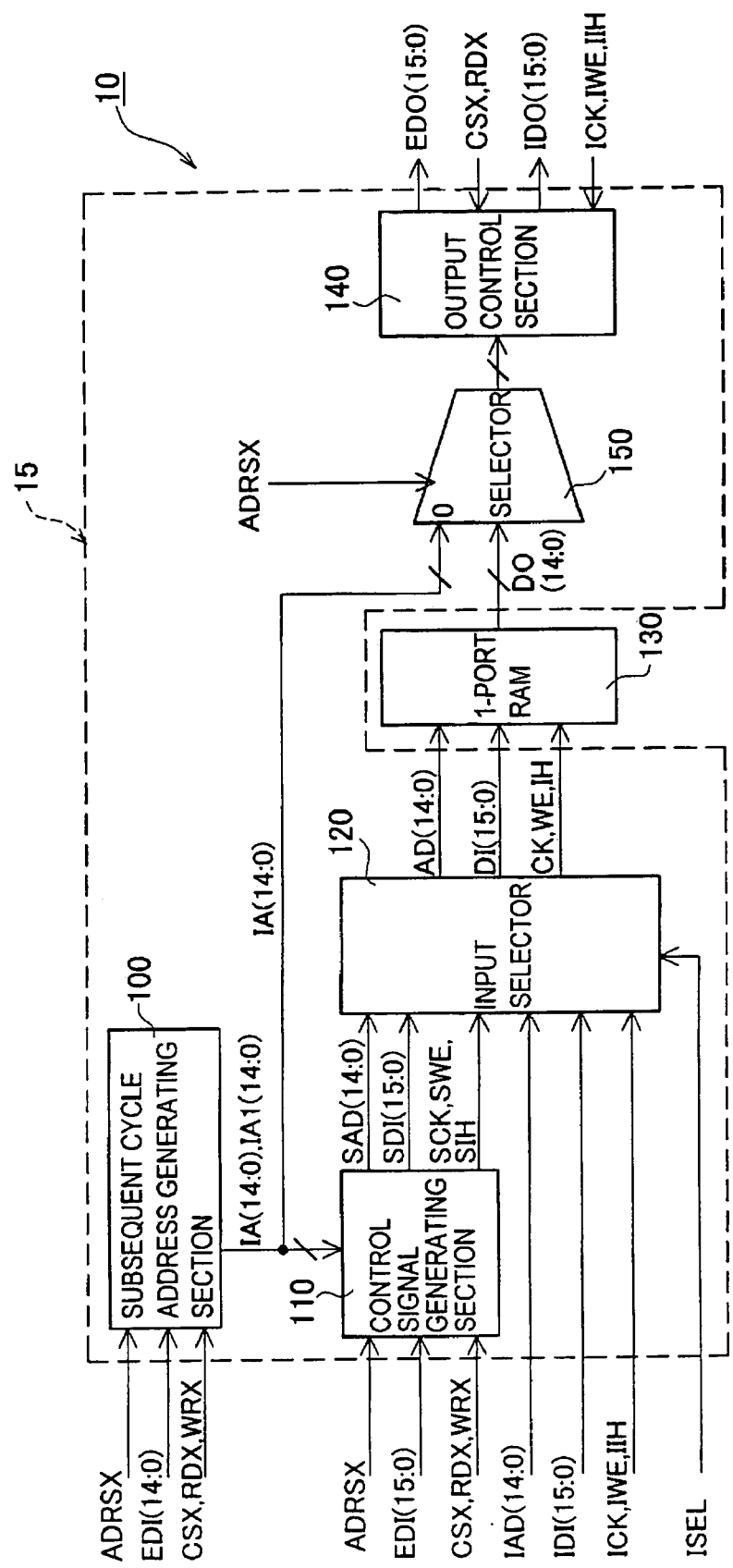
FIG. 2 is a block diagram of circuit structure according to first embodiment.

Then, the data buffer circuit 10 will be described with reference to FIGS. 2 to 9. As shown in FIG. 2, the data buffer circuit 10 is made up of a one-port RAM 130 (synchronous memory circuit) that operates in synchronization with the clock signal CK, and an interface circuit 15 (dotted line portion).

In addition, the interface circuit 15 includes a control signal 110 (clock signal generating section) that inputs a control signal of the main system 2 (asynchronous circuit) and outputs a control signal which is synchronous with the clock signal CK, and an input selector 120 that selectively outputs a control signal that has been generated by the control signal generating section 110 and a control signal from the image processing system 1A according to a select signal ISEL. In addition, the data buffer circuit 10 includes a subsequent cycle address generating section 100 that generates a present cycle address IA (14:0) which is an address corresponding to the access from the main system 2, and a subsequent cycle address IA1 (14:0) which is a subsequent address of the present cycle address IA (14:0) in the continuous access to the one-port RAM 130, an output selector 150 that selectively outputs any one of data signal DO (15:0) that is outputted from the one-port RAM 130 and the present cycle address IA (14:0), and an output control section 140 that controls an output of the output selector 150.

The subsequent cycle address generating section 100 and the control signal generating section 110 are connected to the main system 2 through the clock asynchronous bus BA. Also, the input selector 120 and the output control section 140 are connected to the image processing system 1A through the clock synchronous bus BC.

The subsequent cycle address generating section 100 generates the present cycle address IA (14:0) and the subsequent cycle address IA1 (14:0) which are used in the present access according to the respective signals of the clock asynchronous bus BA, that is, a data signal EDI (14:0) which is a lower significance 15 bits among a data signal EDI (15:0) of a 16 bit length, a chip select signal CSX, a read control signal RDX, a write control signal WRX, and a command signal ADRSX that is one bit of the address signal.

Figure 3:
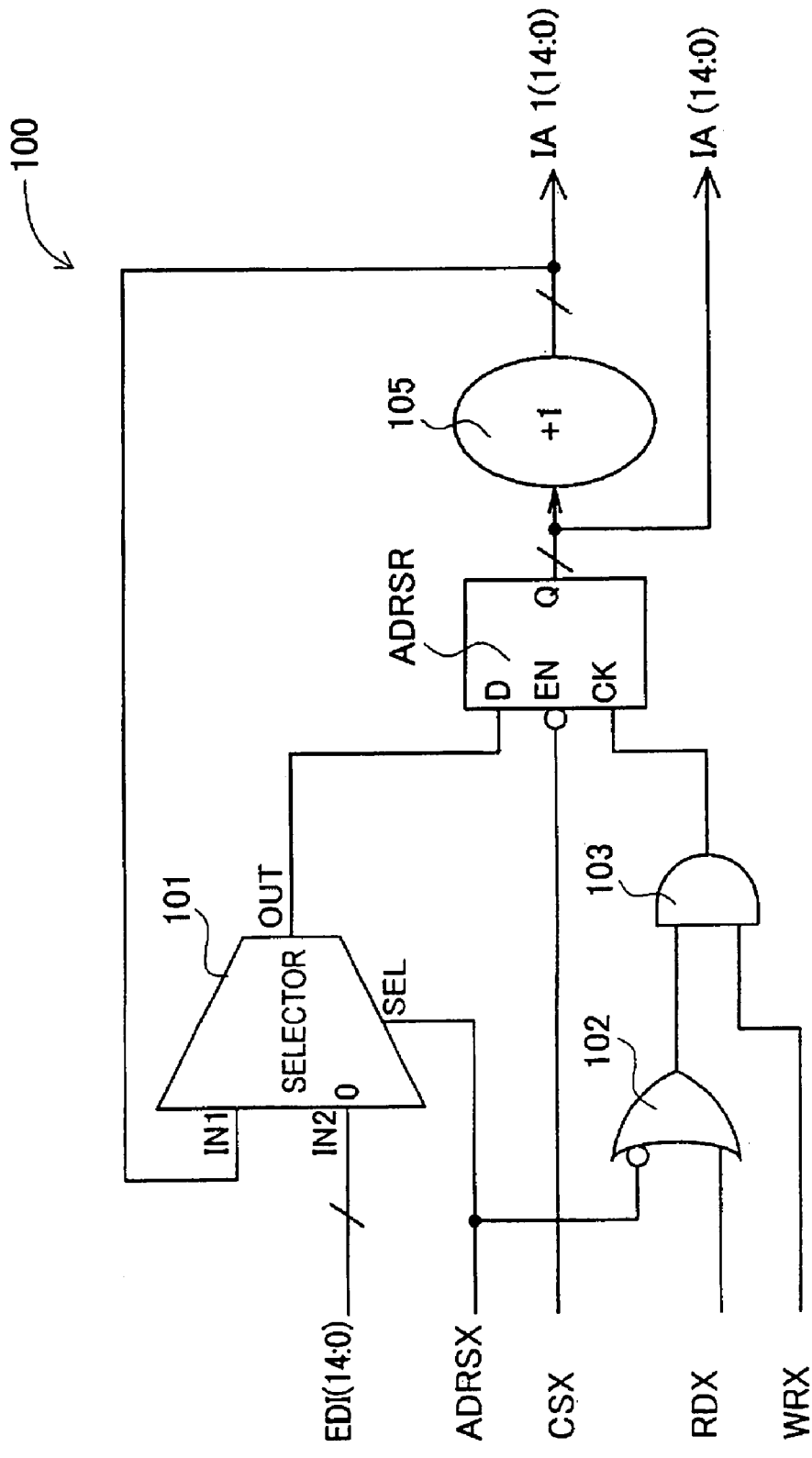
FIG. 3 is a circuit diagram of subsequent cycle address generating section.

Furthermore, the subsequent cycle address generating section 100 will be described in more detail with reference to FIG. 3. The subsequent cycle address generating section 100 includes a two-input selector 101, an OR gate 102, an AND gate 103, and a known incrementor 105 of a 15 bit length which adds 1 to an address register ADRSR of the 15 bit length and an input, and outputs the added results.

The address register ADRSR holds and outputs the present cycle address IA (14:0) of the 15 bitlength. Also, the incrementor 105 inputs the present cycle address IA (14:0) that is an output of the address register ADRSR, and outputs the subsequent cycle address IA1 (14:0) obtained by adding one to the inputted present cycle address. In addition, the two-input selector 101 selects and outputs any one of the subsequent cycle address IA1 (14:0) and the data signal EDI (14:0) which is low 15 bits of the 16 bit length outputted from the main system 2 according to the command signal ADRSX. More specially, the two-input selector 101 outputs the subsequent cycle address IA1 (14:0) when the command signal ADRSX is high level, and outputs the data signal EDI (14:0) when the command signal ADRSX is low level. An output of the two-input selector 101 is connected to an input D of an address register ADRSR.

An input EN of the address register ADRSR is connected to a chip select signal CSX. Accordingly, in the case where the chip select signal CSX is low level, the address register ADRSR is updated.

A clock input CK of the address register ADRSR inputs the write control signal WRX, the read control signal RDX and the command signal ADRSX, and is generated by the combination logic of the OR gate 102 and the AND gate 103.

In the case where the command signal ADRSX is high level, when the write control signal WRX or the read control signal RDX changes to the low level, the clock input DCK becomes low level. That is, a leading edge of the clock input DCK is generated at any timing of the write control signal WRX and the read control signal RDX. Also, an input D of the address register ADRSR is inputted with the subsequent cycle address IA1 ((14:0)). For that reason, the present cycle address IA (14:0) is added with 1 and updated at any leading edge of the read control signal RDX and the write control signal WRX.

On the other hand, in the case where the command signal ADRSX is low level, when the write control signal WRX changes to the low level, an address initialization command CMA (initialization command) is issued, and the contents of the address register ADRSR are rewritten into the contents of the data signal DI ((14:0)).

That is, when the address initialization command CMA is issued, a clock input DCK of the address register ADRSR becomes low level, and the clock input DCK rises at a timing of the leading edge of the write control signal WRX. Also, the input D of the address register ADRSR is inputted with the data signal EDI ((14:0)). For that reason, the present cycle address IA (14:0) is updated to the contents of the data signal EDI ((14:0)) at the leading edge of the write control signal WRX.

The data buffer circuit 10 sets the initial address by the data signal EDI (14:0) in the initial cycle, and continuously updates the address by adding 1 to the present value in the subsequent cycles in the continuous access to the one-port RAM 130, to thereby generate the address signals necessary for the continuous accesses.

Returning to FIG. 2, the control signal generating section 110 generates the clock signal SCK, a write enable signal SWE and an inhibit signal SIH according to the chip select signal CSX, the read control signal RDX and the write control signal WRX. The data signal SDI (15:0) is through-outputted a data signal EDI (15:0) of the 16 bit length of the clock asynchronous bus BA. Also, the control signal generating section 110 selectively outputs any one of the present cycle address IA (14:0) and the subsequent cycle address IA1 (14:0) to the address signal SAD (14:0) of the control 15 bit length according to a kind of the access to the one-port RAM 130.

Figure 4:
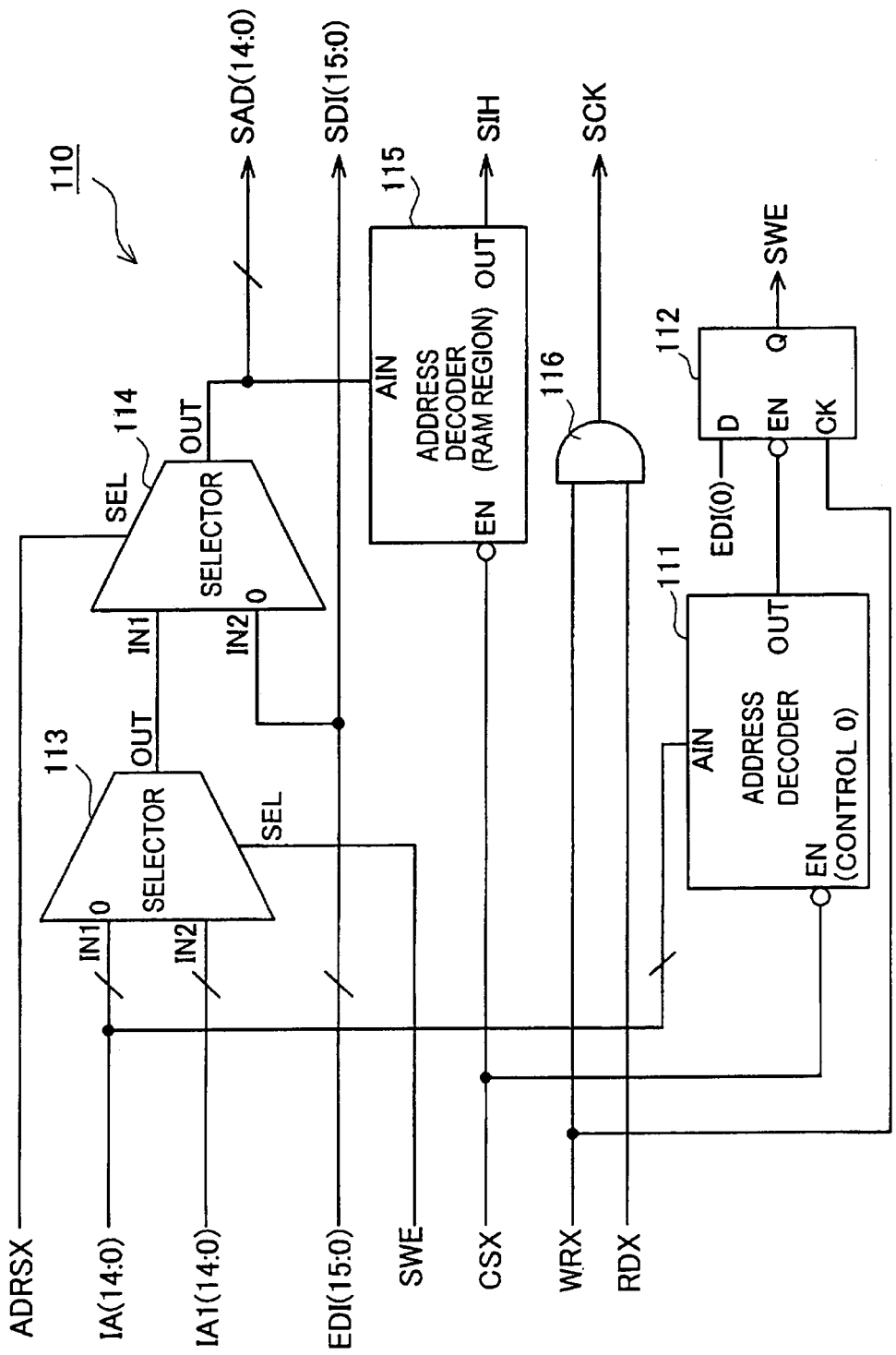
FIG. 4 is a circuit diagram of control signal generating section.
Figure 5:
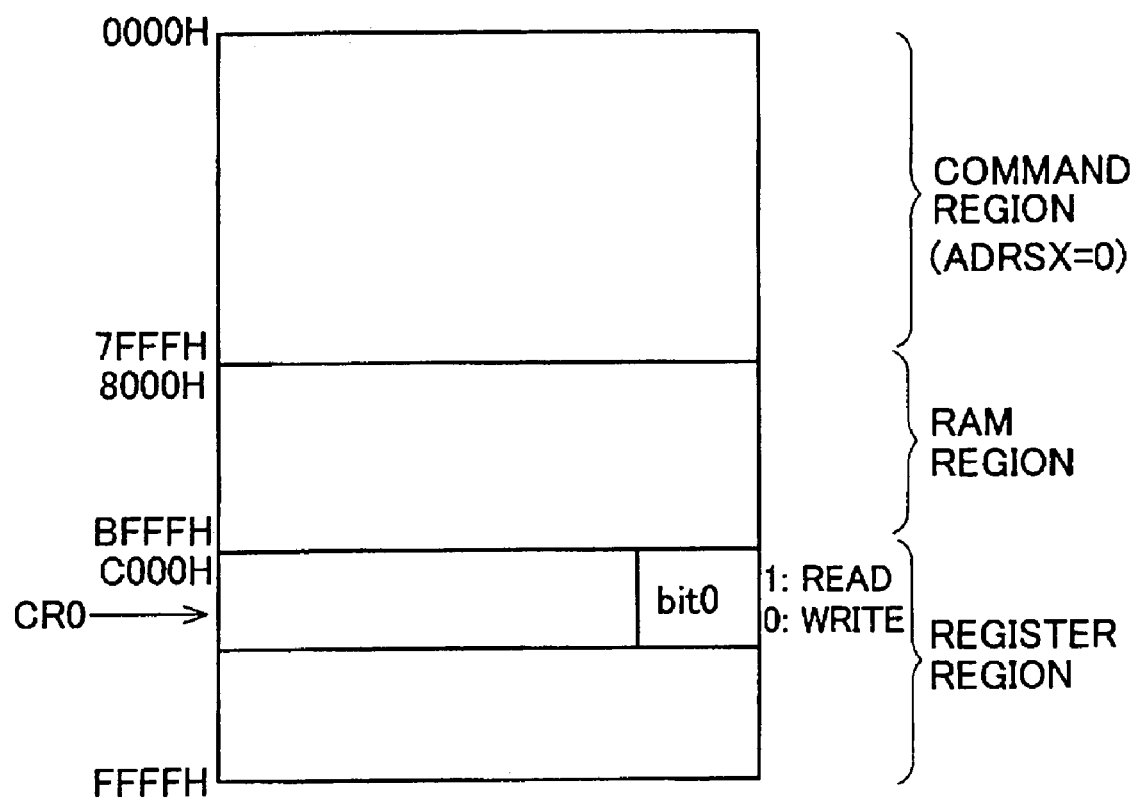
FIG. 5 is an explanatory diagram of address arrangement.

In addition, the control signal generating section 110 will be described in more detail with reference to FIGS. 4 and 5. The control signal generating section 110 includes an address decoder 111, a D flip flop 112, a first selector 113, a second selector 114, an address decoder 115, and an AND gate 116. The control signal generating section 110 generates a write enable signal SWE, an address signal SAD ((14:0)), a data signal SDI (15:0), an inhibit signal SIH and a clock signal SCK.

Now, for the following description, the address arrangement of the main system 2 and the data buffer circuit 10 will be described with reference to FIG. 5. The data buffer circuit 10 is accessed by using the 16-bit address of the main system 2. The highest-order bit of the address of the main system 2 is allocated to the command signal ADRSX, and other 15 bits are mapped to the addresses of a RAM region and a register region included in the data buffer circuit 10. That is, the data buffer circuit 10 has an address space of 15 bits.

More specifically, addresses 0000H to 7FFFH in an address space (0000H to FFFFH) of 16 bits of the main system 2 are allocated to a command region for setting the command signal ADRSX to the low level, addresses 8000H to BFFFH are allocated to the RAM region, and addresses C000H to FFFFH are allocated to the register region.

Also, the control register CR0 is allocated to an address C000H in the register region.

Returning to FIG. 4, the control register CR0 is made up of an address decoder 111 and a D flip flop 112.

In the address decoder 111, the present cycle address IA (14:0) is inputted to an address input terminal AIN, and a chip select signal CSX is inputted to an enable terminal EN, to thereby decode the present cycle address IA ((14:0)). More specifically, when the chip select signal CSX is low level, and the present cycle address IA (14:0) is identical with 4000H, the low level is outputted from the output terminal OUT.

Also, in the D flip flop 112, the data signal EDI (0) (bit 0 of the data signal EDI (15:0)) is inputted to the data input terminal D, the output of the address decoder 111 is inputted to the enable terminal EN, and the write control signal WRX is inputted to the clock terminal CK. In the D flip flop 112, the signal level that has been inputted to the data input terminal D is held and outputted to the output terminal Q in the leading edge of a signal that is inputted to the clock terminal CK in the case where an input to the enable terminal EN is low level. Accordingly, the lowest-order bit of data that has been write-accessed to the control register CR0 of the data buffer circuit 110 is held and outputted as a write enable signal SWE.

In the first selector 113, any one of the present cycle address IA (14:0) that has been inputted to an input terminal IN1 and a subsequent cycle address IA1 (14:0) that has been inputted to an input terminal IN2 is selectively outputted to OUT according to the write enable signal SWE that has been inputted to the SEL. More particularly, in the case where the write enable signal SWE is low level (write access), the present cycle address IA (14:0) is selectively outputted. In the case where the write enable signal SWE is high level (read access), the subsequent cycle address IA1 (14:0) is selectively outputted.

In the second selector 114, any one of the output of the first selector 113 that has been inputted to IN1 and the low 15 bits of the data signal EDI (15:0) that has been inputted to IN2 is selectively outputted to OUT according to the command signal ADRSX that has been inputted to SEL. More specifically, in the case where the command signal ADRSX is low level, the data signal EDI (15:0) is selectively outputted, and in the case where the command signal ADRSX is high level, the output of the first selector 113 is selectively outputted.

Accordingly, in the case where the command signal ADRSX is low level, the low 15 bits of the data signal EDI (15:0) is outputted to an address signal SAD ((14:0)). On the other hand, in the case where the command signal ADRSX is high level, the present cycle address IA (14:0) is outputted to the address signal SAD (14:0) in the write access, and the subsequent cycle address IA1 (14:0) is outputted to the address signal SAD ((14:0)) in the read access.

In the address decoder 115, the chip select signal CSX is inputted to the terminal EX, and the address signal SAD (14:0) is inputted to the terminal AIN, to thereby decode the address signal SAD ((14:0)). In the case where the chip select signal CSX is low level and the address signal SAD (14:0) takes the address value of the RAM region, the low level is outputted to the inhibit signal SIH from the output terminal OUT.

The AND gate 116 inputs the write control signal WRX and the read control signal RDX, and outputs its logical product to the clock signal SCK. That is, a period of the low level in the clock signal SCK is obtained by combining the periods of the low levels of the write control signal WRX and the read control signal RDX together. Also, because an active period is a low level period in the write control signal WRX and the read control signal RDX, the termination edge in the active period becomes a leading edge. Also, since the one-port RAM 130 operates at the leading edge of the clock signal SCK, the rising edge of the clock signal SCK becomes an active edge. That is, the clock signal SCK that has the leading edge as the active edge has an active edge having the termination edges of the respective active periods of the write control signal WRX and the read control signal RDX together.

Returning to FIG. 2, the input selector 120 selects and outputs any one of a group consisting of the address signal SAD ((14:0)), the data signal SDI (15:0), the clock signal SCK, the write enable signal SWE and the inhibit signal SIH, and a group consisting of the address signal IAD (14:0) of the clock synchronous bus BC, the data signal IDI (15:0), the clock signal ICK, the write enable signal IWE, and the inhibit signal IIH according to the select signal ISEL. More specifically, in the case where the select signal ISEL is low level, the former group is selectively outputted from the above groups, and in the case where the select signal ISEL is high level, the latter group is selectively outputted therefrom.

Also, the one-port RAM 130 is a known RAM having a pair of ports consisting of the address, data and the control signal. The one-port RAM 130 inputs the address signal AD ((14:0)), the clock signal CK, the write enable signal WE and the inhibit signal IH. In the case of the write access (write enable signal WE is low level), the one-port RAM 130 inputs the data signal DI (15:0), and in the case of the read access (write enable signal WE is high level), the one-port RAM 130 outputs the data signal DO. The one-port RAM 130 starts to output the data signal DO (15:0) in the read access, and takes in the data signal DI (15:0) in the write access.

Also, the output selector 150 selectively outputs one of the data signal DO (14:0) and the present cycle address IA (14:0) which are outputted from the one-port RAM 130 according to the command signal ADRSX. More particularly, in the case where the command signal ADRSX is high level, the output selector 150 outputs the data signal DO ((14:0)), and in the case where the command signal ADRSX is low level, the output selector 150 outputs the present cycle address IA ((14:0)).

Also, the output control section 140 controls 3-state output with respect to the clock asynchronous bus BA and the clock synchronous bus BC. Although being not shown, the output control section 140 is made up of the known 3-state output buffer and the combination circuit. The output control section 140 conducts the 3-state control on the data signal EDO according to the chip select signal CSX and the read control signal RDX in the clock asynchronous bus BA. Also, the output control section 140 conducts the 3-state control on the data signal IDO according to the clock signal ICK, the write enable signal IWE and the inhibit signal IIH in the clock synchronous bus BC.

Accordingly, the main system 2 set the chip select signal CSX and the read control signal RDX to the low level, thereby making it possible to read the output of the output selector 150.

The image processing system 1A is exclusively controlled in such a manner that any one of the image processing system 1A and the main system 2 accesses to the data buffer circuit 10. In the exclusive control, the image processing system 1A generates an identification signal (not shown) indicative of any system accessing to the data buffer circuit 10. The identification signal becomes high level in the case where the image processing system 1A accesses to the data buffer circuit 10, and becomes low level in the case where the main system 2 accesses to the data buffer circuit 10. In the input selector 120, the identification signal is used for the select signal ISEL. For that reason, a group of the control signals in the system that accesses to the data buffer circuit 10 is selectively outputted.

Subsequently, the address initialization command CMA (initialization command) and the address monitor command CMM (monitor command) with respect to the data buffer circuit 10 will be described below.

In the following description, simply called "read access" or "write access" is directed to an access to the data buffer circuit 10 from the main system 2.

In the data buffer circuit 10 according to the first embodiment, it is impossible to directly designate the address to the one-port RAM 130 from the main system 2 and access to the one-port RAM 130. The address for accessing to the one-port RAM 130 is designated indirectly through the address register ADRSR. Accordingly, it is necessary to set the address register ADRSR prior to an access to the one-port RAM 130. The address register ADRSR is set by issuing the address initialization command CMA (initialization command). As described above, the address initialization command CMA is issued by write-accessing to a set value after the command signal ADRSX is set to the low level. In the first embodiment, the highest order bit of the address signal in the main system 2 of the 16 bit length is allocated to the command signal ADRSX (refer to FIG. 5). Accordingly, when the write access is executed with data of the set value at any address of the addresses 0000H to 7FFFH of the main system 2, the address initialization command CMA is issued, and the address register ADRSR is set to the set value.

Also, when the read access is executed after setting the command signal ADRSX to the low level, the address monitor command CMM (monitor command) is issued. When the address monitor command CMM is issued, the present cycle address IA (14:0) is outputted to the data signal EDO (15:0) through the output selector 150 and the output control section 140. The main system 2 issues the address monitor command CMM so as to monitor the value of the present cycle address IA ((14:0)). Also, in this situation, because the OR gate 102 (address update suppressing section) takes the logical OR of the inversion logic of the command signal ADRSX and the read control signal RDX, even if the read control signal RDX becomes low level, the clock of the address register ADRSR does not change. That is, the OR gate 102 suppresses the update of the address register ADRSR due to issuance of the address monitor command CMM. Accordingly, the address register ADRSR is not affected by the issuance of the address monitor command CMM.

In the first embodiment, there is exemplified a case in which the highest-order bit of the address signal of the main system 2 is allocated to the command signal ADRSX. Alternatively, for example, it is possible to generate a signal that is generated when the address signal of the main system 2 is indicative of a given value or a given range included in the address space of the one-port RAM 130 as the command signal ADRSX. In this case, because the decoder circuit that generates the command signal ADRSX is necessary, and a portion corresponding to the address of the given value or the given range cannot be used in the one-port RAM 130, the structure according to the first embodiment is preferable.

Subsequently, the operation waveform of the data buffer circuit 10 will be described with reference to FIG. 6. An access to the one-port RAM 130 from the image processing system 1A is identical with the known access method using the synchronous control signal, and therefore its description will be omitted.

Figure 6:
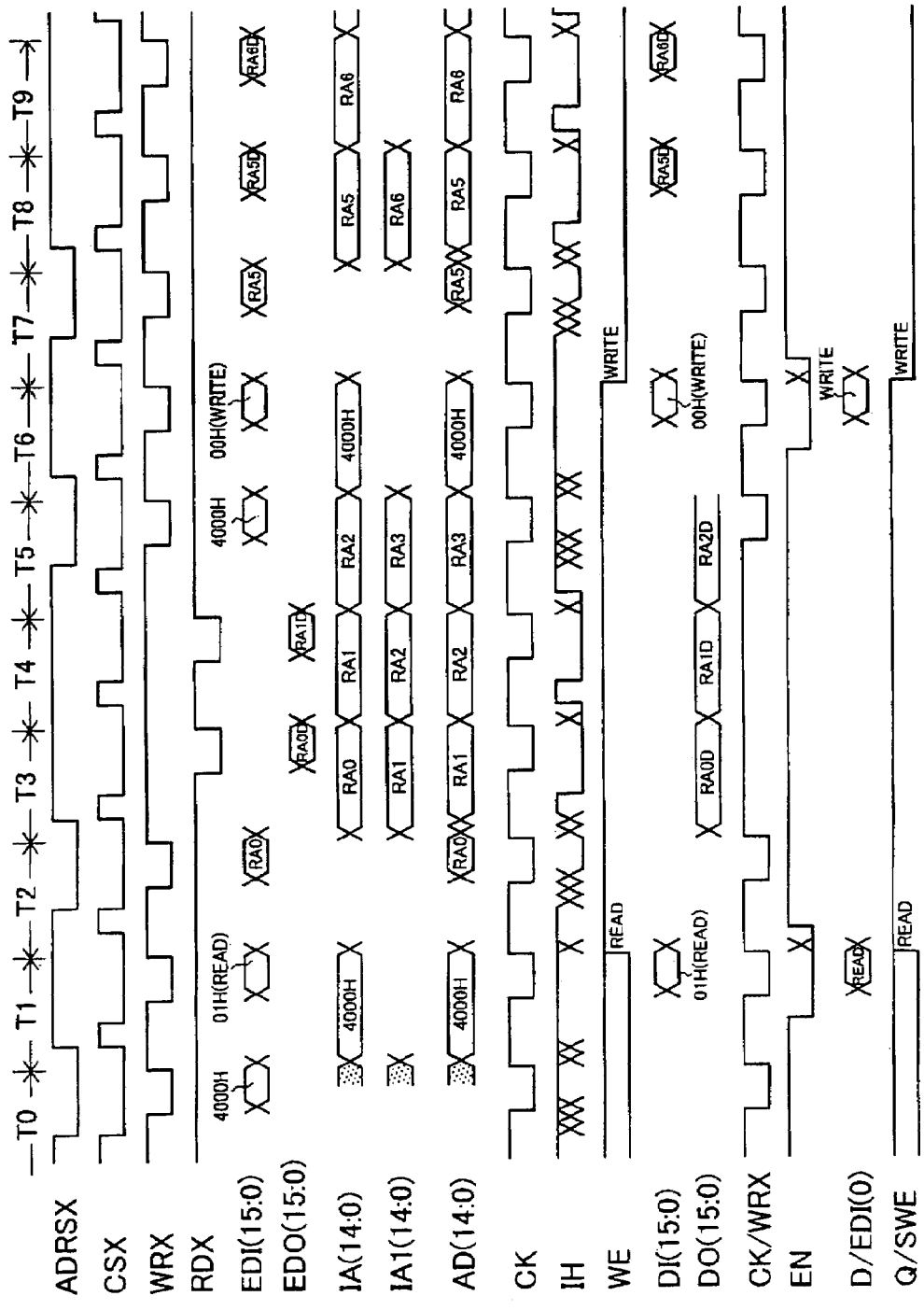
FIG. 6 is a diagram of operation waveforms according to first embodiment.

The waveforms shown in FIG. 6 are divided by sections T0 to T9 with the leading neighborhoods of the clock signals CK as boundaries. Among those sections, the section T0 to T4 are operation waveforms in the case of the read access, and the sections T5 to T9 are operation waveforms in the case of the write access.

First, the operation waveforms in the case of the read access will be described.

In the section T0, in the data buffer circuit 10, the low level is inputted to all of the command signal ADRSX, the chip select signal CSX and the write control signal WRX, and an address value 4000H of the control register CR0 is inputted to the data signal EDI ((14:0)). For that reason, the address initialization command CMA is issued, and the address value 4000H is set to the present cycle address IA ((14:0)).

In the section T1, in the data buffer circuit 10, the low level is inputted to all of the chip select signal CSX and the write control signal WRX, and a READ command (01H) is inputted to the data signal ED1 (15:0). For that reason, the data buffer circuit 10 becomes in the state of the read access, and a write enable signal SWE (WE) is set to the high level.

In the section T2, in the data buffer circuit 10, the low level is inputted to all of the command signal ADRSX, the chip select signal CSX and the write control signal WRX, and an address RA0 that is the initial address is inputted to the data signal EDI (14:0). For that reason, the address initialization command CMA is issued, and the address RA0 is inputted to the address signal AD (14:0) in the one-port RAM 130. In addition, the read access of the data RA0D corresponding to the address RA0 starts in the leading edge of the clock signal CK.

Also, the address RA0 of the RAM region address is set to the present cycle address IA ((14:0)), and in response to the setting of the address RA0, a subsequent address RA1 of RA0 is outputted to the subsequent cycle address IA1 ((14:0)).

In the section T3, in the data buffer circuit 10, the low level is inputted to all of the chip select signal CSX and the read control signal RDX. For that reason, in the data buffer circuit 10, the data RA0D that starts the read access in the section T2 is outputted.

Also, because all of the command signal ADRSX and the write enable signal SWE are high level, a value of the subsequent cycle address IA1 ((14:0)), that is, the address RA1 is inputted to the address signal AD in the one-port RAM 130.

Furthermore, in the leading edge of the clock signal CK, the read access of the data RA1D corresponding to the address RA1 starts. In addition, the address RA1 of the RAM region address is set to the present cycle address IA ((14:0)), and in response to the setting of the address RA1, an address RA2 that is the subsequent cycle address of the address RA1 is outputted to the subsequent cycle address IA1 ((14:0)).

In the section T4, the low level is inputted to all of the chip select signal CSX and the read control signal RDX. For that reason, the data RA1D that starts the read access in the section T3 is outputted in the data buffer circuit 10.

Also, because all of the command signal ADRSX and the write enable signal SWE are high level, a value of the subsequent cycle address IA1 ((14:0)), that is, the address RA2 is inputted to the address signal AD in the one-port RAM 130.

Furthermore, in the leading edge of the clock signal CK, the read access of the data RA2D corresponding to the address RA2 starts. In addition, the address RA2 of the RAM region address is set to the present cycle address IA ((14:0)), and in response to the setting of the address RA2, a subsequent address RA3 of the RA2 is outputted to the subsequent cycle address IA1 ((14:0)).

In the data buffer circuit 10 according to the first embodiment, in the case of conducting the sequential read accesses as described above, the subsequent cycle address IA1 (14:0) is outputted to the one-port RAM 130 instead of the address that is outputted from the main system 2, and the read access of data is conducted. For example, the data that is outputted at a timing when the read control signal RDX changes from the high level (inactive state) to the low level (active state) in the section T4 is data RA1D that is read-accessed by using the address RA1 that has been outputted from the IA1 ((14:0)) in the section T3.

Subsequently, the operation waveform in the case of the write access will be described.

In the section T5, in the data buffer circuit 10, the low level is inputted to all of the command signal ADRSX, the chip select signal CSX and the write control signal WRX, thereby the address initialization command CMA is issued and an address value 4000H of the control register CR0 is inputted to the data signal EDI ((14:0)). For that reason, the address value 4000H is set to the present cycle address IA ((14:0)).

In the section T4, the RA2D that starts the read access is outputted from the one-port RAM 130, but is not outputted to the main system 2.

In the section T6, in the data buffer circuit 10, the low level is inputted to all of the chip select signal CSX and the write control signal WRX, and a WRITE command (00H) is inputted to the data signal ED1 (15:0). For that reason, the data buffer circuit 10 becomes in the state of the write access, and the write enable signal SWE (WE) is set to the low level.

In the section T7, in the data buffer circuit 10, the low level is inputted to all of the command signal ADRSX, the chip select signal CSX and the write control signal WRX, thereby the address initialization command CMA is issued and an address RA5 is inputted to the data signal EDI ((14:0)). For that reason, the address value RA5 is inputted to the address signal AD (14:0) in the one-port RAM 130.

In addition, the address RA5 that is the initial address is set to the present cycle address IA ((14:0)), and in response to the setting of the address RA5, RA6 that is a subsequent cycle address of the RA5 is outputted to the subsequent cycle address IA1 ((14:0)).

In the section T8, in the data buffer circuit 10, the low level is inputted to all of the chip select signal CSX and the write control signal WRX, and an address RA5D is inputted to the data signal DI (15:0).

Also, because the high level is inputted to the command signal ADRSX, and the low level is inputted to the write enable signal SWE, a value of the present cycle address IA ((14:0)), that is, the address RA5 is inputted to the address signal AD in the one-port RAM 130.

In addition, in the leading edge of the clock signal CK, the write access of the data RA5D with respect to the address RA5 is conducted. Furthermore, the address RA5 of the RAM region address is set to the present cycle address IA ((14:0)), and in response to the setting of the address RA5, a subsequent address RA6 of the RA5 is outputted to the subsequent cycle address IA1 ((14:0)).

In the section T9, in the data buffer circuit 10, the low level is inputted to all of the chip select signal CSX and the write control signal WRX, and an address RA6D is inputted to the data signal DI (15:0).

Also, because the high level is inputted to the command signal ADRSX, and the low level is inputted to the write enable signal SWE, a value of the present cycle address IA ((14:0)), that is, the address RA6 is inputted to the address signal AD in the one-port RAM 130.

In addition, the write access of the data RA6D with respect to the address RA6 is conducted in the leading edge of the clock signal CK.

In the data buffer circuit 10 according to the first embodiment, in the case of conducting the continuous read access, the main system 2 can take in correct data corresponding to the address in the present access cycle from the one-port RAM 130.

Figure 7:
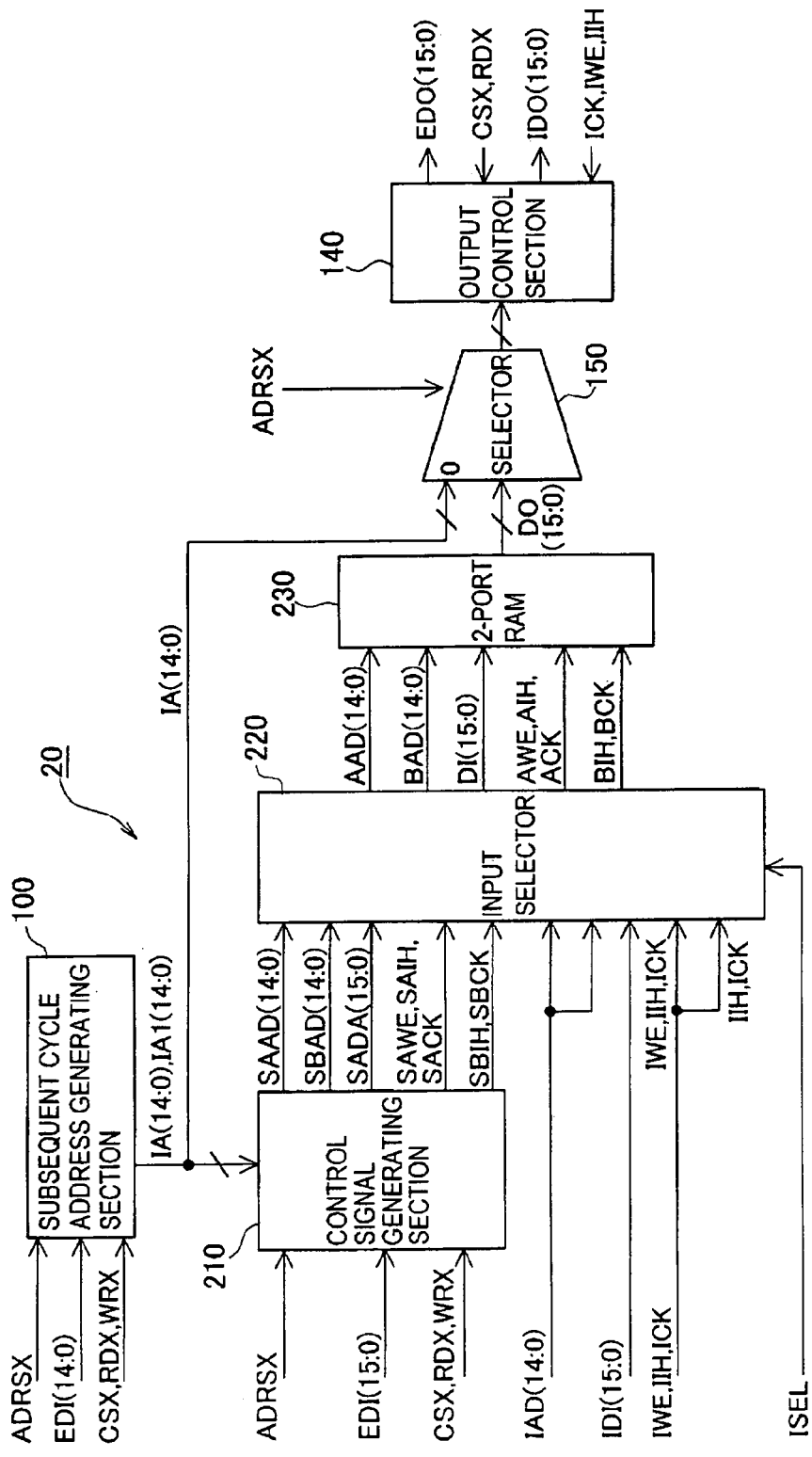
FIG. 7 is a diagram of circuit structure according to second embodiment.
Figure 8:
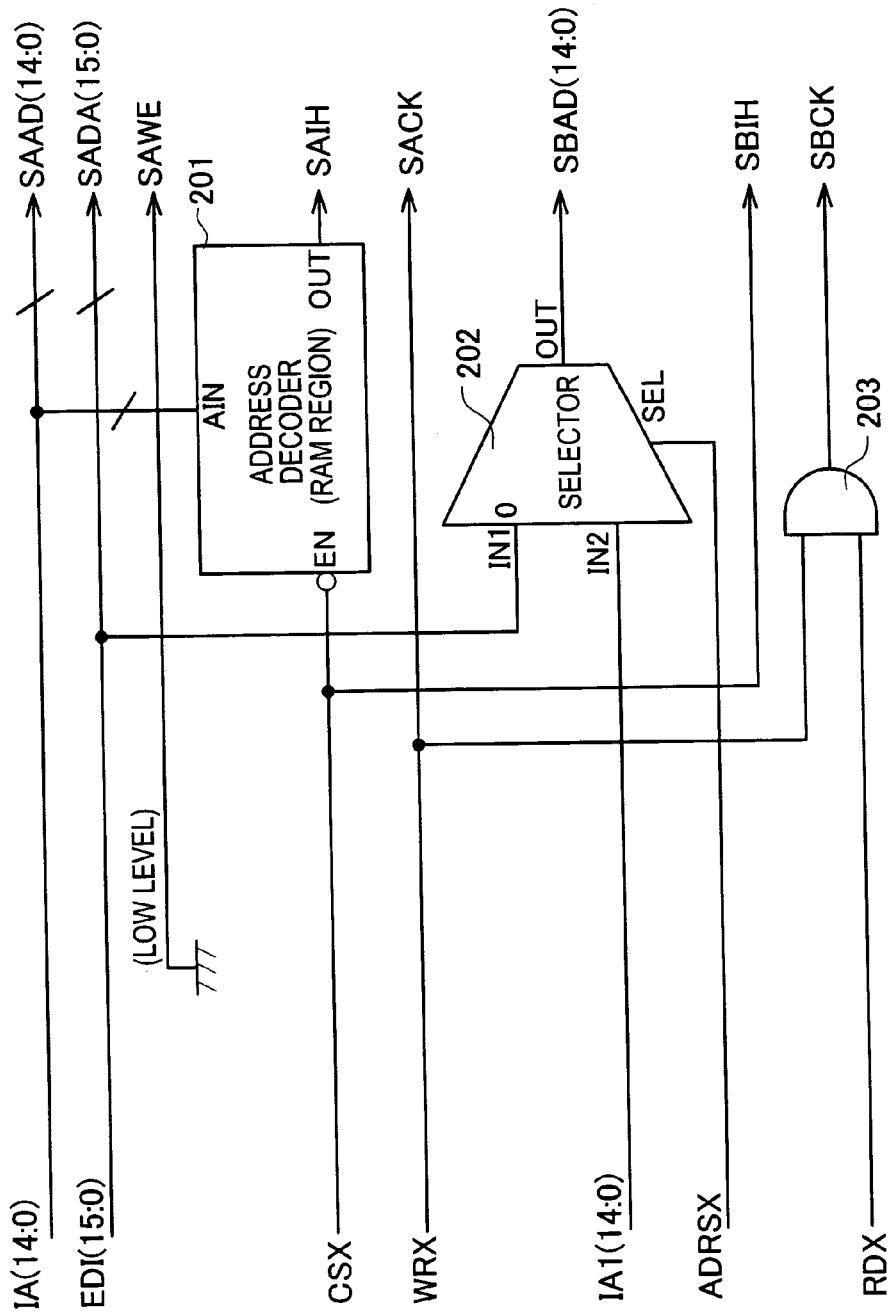
FIG. 8 is a circuit diagram of control signal generating section.

Subsequently, a data buffer circuit 20 according to a second embodiment will be described with reference to FIGS. 7 to 9. The data buffer circuit 20 includes a two-port RAM 230 that operates in synchronization with the clock signal CK, a control signal generating section 210 that inputs the control signal of the main system 2 and outputs the control signal that is synchronous with the clock signal CK, and an input selector 220 that selectively outputs the control signal that is generated by the control signal generating section 210 and the control signal from the image processing system 1A in response to the select signal ISEL. In addition, the data buffer circuit 20 includes an subsequent cycle address generating section 100 that generates the subsequent cycle address IA1 (14:0) used in the subsequent access in the sequential accesses to the two-port RAM 230, an output selector 150 that selectively outputs any one of the data signal DO (15:0) that is outputted from the two-port RAM 230 and the present cycle address IA ((14:0)), and an output control section 140 that controls the output of the output selector 150.

Among those components, the subsequent cycle address generating section 100, the output control section 140 and the output selector 140 are identical with the circuits in the first embodiment, and therefore their description will be omitted.

The control signal generating section 210 generates and outputs clock signals SACK, SBCK, a write enable signal SAWE and inhibit signals SAIH and SBIH according to a chip select signal CSX, a read control signal RDX and a write control signal WRX. As the data signal SADA (15:0), the data signal EDI (15:0) of the 16-bit length of the clock asynchronous bus BA is outputted as it is. In addition, as the address signal SAAD (14:0), IA (14:0) is outputted as it is, and as the address signal SBAD ((14:0)), a data signal EDI (14:0) is selectively outputted in the case where the command signal ADRSX is low level, and the subsequent cycle address IA1 (14:0) is selectively outputted in the case where the command signal ADRSX is high level. Also, a write enable signal SAWE outputs the low level.

The input selector 220 selectively outputs any one of a group consisting of an address signal SAAD ((14:0)), an address signal SBAD ((14:0)), a data signal SADA (15:0), a write enable signal SAWE, an inhibit signal SAIH, a clock signal SACK, an inhibit signal SBIH and a clock signal SBCK, and a group consisting of an address signal IAD (14:0) of the clock synchronous bus BC, an address signal IAD ((14:0)), a data signal IDI (15:0), a write enable signal IWE, an inhibit signal IIH, a clock signal ICK, an inhibit signal IIH, and a clock signal ICK in response to the select signal ISEL. More specifically, in the case where the select signal ISEL is low level, the former group is selectively outputted from the above groups, and in the case where the select signal ISEL is high level, the latter group is selectively outputted from those groups.

Also, the select signal ISEL uses an identification signal in an exclusive control as in the first embodiment, and therefore their description will be omitted.

The two-port RAM 230 is a known RAM having two pairs of ports consisting of an address, data and a control signal. The accesses to the respective ports can be conducted, independently. For example, in the respective ports, clocks of different frequencies can be used, and the different addresses can be accessed.

In the two-port RAM 230 according to the second embodiment, a first port can conduct the read and write access, and a second port can conduct only the read access. In addition, the first port is inputted with the address signal AAD ((14:0)), the data signal DI (15:0), the write enable signal AWE, the inhibit signal AIH, and the clock signal ACK. The second port is inputted with the address signal BAD ((14:0)), the inhibit signal BIH and the clock signal BCK. Also, the second port outputs the data signal BDO (15:0).

The data buffer circuit 20 according to the second embodiment is made up of the two-port RAM 230 having a port that enables read and write accesses and a port that enables only read access. However, it is always unnecessary to use such a two-port RAM. That is, the two-port RAM used in the data buffer circuit 20 may have one-port that enables at least the read access, and the other port that enables at least the write access.

In the data buffer circuit 20 according to the second embodiment, the main system 2 is connected to the subsequent cycle address generating section 100 and the control signal generating section 210 through the clock asynchronous bus BA. On the other hand, the image processing system 1A is connected to the input selector 220 and the output control section 140 through the clock synchronous bus BC. Also, the present cycle address IA (14:0) and the subsequent cycle address IA1 (14:0) which have been generated by the subsequent cycle address generating section 100 are outputted to the control signal generating section 210. The respective control signals that have been generated in the control signal generating section 210 are inputted one input group of the input selector 220 together with the address signals SAAD ((14:0)), SBAD (14:0) and the data signal SADA (15:0). In addition, the address signal AAD (14:0) (of the first port), the address signal BAD (14:0) (of the second port), the data signal DI (15:0), and the respective control signals, which are selected by the input selector 220, are inputted to the two-port RAM 230. Moreover, the data signal DO (15:0) that is outputted by the two-port RAM 230 is inputted to the output control section 140.

Now, the control signal generating section 210 will be described in more detail with reference to FIG. 8. The control signal generating section 210 includes an address decoder 201, an address selector 202 of the 15-bit length, and an AND gate 203.

The control signal generating section 21 includes the address decoder 201 and the same circuit structure as the control signal generating section 110 in the first embodiment, but is different from the first embodiment in that the selector that switches the address by the read access and the write access, and a portion that generates and holds the write enable signal SWE are not included in the structure. Because the read access and the write access are conducted by the respective ports, individually, the switching of the addresses is unnecessary, and the write enable signal SWE used for switching the addresses is also unnecessary.

In the address decoder 201, the chip select signal CSX is inputted to the enable terminal EN, and the address signal SAAD (14:0) is inputted to the address input terminal AIN, respectively, and those signals are decoded. More specifically, in the case where the chip select signal CSX is low level, and the address signal SAAD (14:0) is an address within the RAM region, the output terminal OUT becomes low level. That is, in the case where the data buffer circuit 20 is selected by the chip select signal CSX, and the address signal SAAD (14:0) is the address within the RAM region, the low level is outputted to the inhibit signal SAIH.

In the address selector 202, any one of the lower significance 15 bit of the data signal EDI (15:0) that has been inputted to the input terminal IN1 and the subsequent cycle address IA1 (14:0) that has been inputted to the input terminal IN2 is selectively outputted according to the command signal ADRSX that has been inputted to the select terminal SEL. More specifically, the lower significance 15 bit of the data signal EDI (15:0) is outputted in the case where the command signal ADRSX is low level, and the subsequent cycle address IA1 (14:0) is outputted in the case where the command signal ADRSX is high level.

The AND gate 203 inputs the write control signal WRX and the read control signal RDX, and its logic product is outputted to the clock signal SBCK. That is, the period of low level in the clock signal SBCK becomes the combination of the periods of low levels of the write control signal WRX and the read control signal RDX. Also, because the active period in the write control signal WRX and the read control signal RDX is the period of low level, the termination edge in the active period becomes a leading edge. Also, since the two-port RAM 230 operates by the leading edge of the clock signal SBCK, the leading edge of the clock signal SBCK becomes an active edge. That is, the clock signal SBCK that has the leading edge as the active edge has an active edge having the termination edges of the respective active periods of the write control signal WRX and the read control signal RDX.

In the address initialization command CMA (initialization command) and the address monitor command CMM (monitor command) with respect to the data buffer circuit 20, after the command signal ADRSX is set to the low level, the address initialization command CMA is issued by executing the write access, and the address monitor command CMM is issued by executing the read access as with the data buffer circuit 10 according to the first embodiment. The details will be omitted because of the same as those in the first embodiment.

Subsequently, the operation waveform of the data buffer circuit 20 will be described with reference to FIG. 9. An access to the two-port RAM 230 from the image processing system 1A is the same as the known access method using the synchronous control signal, and therefore its description will be omitted.

Figure 9:
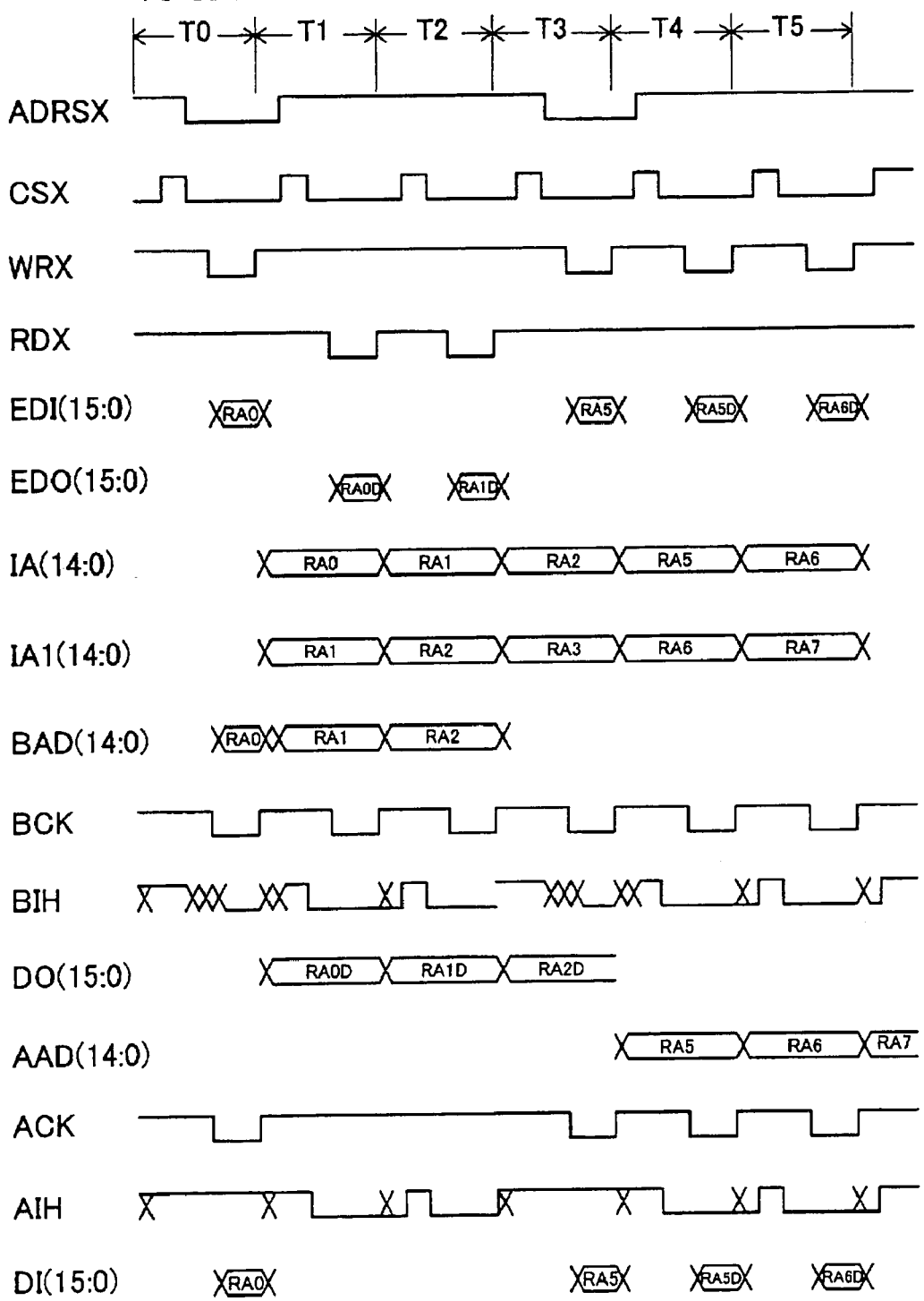
FIG. 9 is a diagram of operation waveforms according to second embodiment.

The waveform shown in FIG. 9 is divided into sections T0 to T5 with the leading neighborhoods of the clock signals BCK as boundaries. Among those sections, the section T0 to T2 are the operation waveforms in the case of the read access, and the sections T3 to T5 are the operation waveforms in the case of the write access.

First, the operation waveform in the case of the read access will be described.

In the section T0, in the data buffer circuit 20, the low level is inputted to all of the command signal ADRSX, the chip select signal CSX and the write control signal WRX, thereby the address initialization command CMA is issued and the address RA0 is inputted to the data signal EDI ((14:0)). For that reason, the address RA0 is inputted to the address signal BAD (14:0) in the two-port RAM 230. In addition, the read access of a data RA0D corresponding to the address RA0 starts in the leading edge of the clock signal CK.

Also, the address RA0 of the RAM region address is set to the present cycle address IA ((14:0)), and in response to the setting of the address RA0, an address RA1 that is a subsequent cycle address of the address RA0 is outputted to the subsequent cycle address IA1 ((14:0)).

In the section T1, in the data buffer circuit 20, the low level is inputted to all of the chip select signal CSX and the read control signal RDX. For that reason, in the data buffer circuit 20, the data RA0D that starts the read access in the section T0 is outputted.

Also, because the command signal ADRSX is high level, a value of the subsequent cycle address IA1 ((14:0)), that is, an address RA1 is inputted to the address signal BAD (14:0) in the two-port RAM 230.

In addition, in the leading edge of the clock signal BCK, the read access of data RA1D corresponding to the address RA1 starts. Further, the address RA1 of the RAM region address is set to the present cycle address IA ((14:0)), and in response to the setting of the address RA1, RA2 that is a subsequent address of RA1 is outputted to the subsequent cycle address IA1 ((14:0)).

In the section T2, the low level is inputted to all of the chip select signal CSX and the read control signal RDX. For that reason, the data RA1D that starts the read access in the section T1 is outputted in the data buffer circuit 20.

Also, because the command signal ADRSX is high level, a value of the subsequent cycle address IA1 ((14:0)), that is, an address RA2 is inputted to the address signal BAD in the two-port RAM 230.

In addition, in the leading edge of the clock signal BCK, the read access of data RA2D corresponding to the address RA2 starts. Further, the address RA2 of the RAM region address is set to the present cycle address IA ((14:0)), and in response to the setting of the address RA2, RA3 that is a subsequent address of RA2 is outputted to the subsequent cycle address IA1 ((14:0)).

Subsequently, the operation waveform in the case of the write access will be described.

In the section T3, in the data buffer circuit 20, the low level is inputted to all of the command signal ADRSX, the chip select signal CSX and the write control signal WRX, thereby the address initialization command CMA is issued and an address RA5 is inputted to the data signal EDI ((14:0)).

Thereby, the address RA5 that is an initial address is set to the present cycle address IA ((14:0)), and in response to the setting of the address RA5, RA6 that is a subsequent address of RA5 is outputted to the subsequent cycle address IA1 ((14:0)).

In the section T2, the RA2D that starts the read access is outputted to the output control section 140 from the two-port RAM 230, but not outputted to the main system 2 from the output control section 140.

In the section T4, in the data buffer circuit 20, the low level is inputted to all of the chip select signal CSX and the write control signal WRX, and data RA5D is inputted to the data signal EDI (15:0).

Also, a value of the present cycle address IA ((14:0)), that is, an address RA5 is inputted to the address signal AAD (14:0) of the two-port RAM 230.

In addition, the write access of the data RA5D to the address RA5 is conducted in the leading edge of the clock signal ACK. In addition, the address RA5 of the RAM region address is set to the present cycle address IA ((14:0)), and in response to the setting of the address RA6, an address RA7 that is a subsequent cycle address of the address RA6 is outputted to the subsequent cycle address IA1 ((14:0)).

In the section T5, in the data buffer circuit 20, the low level is inputted to all of the chip select signal CSX and the write control signal WRX, and data RA6D is inputted to the data signal EDI (15:0).

Also, a value of the present cycle address IA ((14:0)), that is, an address RA6 is inputted to the address signal AAD (14:0) of the two-port RAM 230.

In addition, a write access of the data RA6D to the address RA6 is conducted in the leading edge of the clock signal ACK.

In the data buffer circuit 20 of the second embodiment, it is unnecessary to set a write enable signal SWE that is required in the data buffer circuit 10 of the first embodiment in the read access and the write access. For that reason, for example, in the case where the read access and the write access are alternately conducted, the total number of accesses can be reduced as compared with that of the data buffer circuit 10 of the first embodiment. Also, a circuit corresponding to the first selector 113 that selects the present cycle address IA (14:0) and the subsequent cycle address IA1 (14:0) in the first embodiment is omitted from the control signal generating section 210. For that reason, the data buffer circuit 20 can be made up of a simple circuit.

Subsequently, a data buffer circuit 30 according to a third embodiment will be described with reference to FIGS. 10 and 11. The data buffer circuit 30 includes a two-port Ram 230 that operates in synchronization with a clock signal CK, a control signal generating section 300 that inputs a control signal from the main system 2 and outputs the control signal that is synchronous with the clock signal CK, and an input selector 220 that selectively outputs the control signal that has been generated by the control signal generating section 300 and the control signal from the image processing system 1A. In addition, the data buffer circuit 30 includes an output control section 140 that controls the output of the two-port RAM 230.

Among those components, the output control section 140, the input selector 220 and the two-port RAM 230 are identical with those in the second embodiment, and therefore their description will be omitted.

In the data buffer circuit 30 according to the third embodiment, the main system 2 is connected to an subsequent cycle address generating section 100 and the control signal generating section 300 through a clock asynchronous bus BA. On the other hand, an image processing system 1A is connected to the input selector 220 and the output control section 140 through clock synchronous bus BC. The respective control signals that have been generated by the control signal generating section 300 is inputted to one input group of the input selector 220 together with address signals SAAD ((14:0)), SBAD (14:0) and a data signal SADA (15:0). In addition, the address signal AAD (14:0) of the first port, the data signal DI (15:0), the address signal BAD (14:0) of the second port, and the respective control signals, which are selected by the input selector 220, are inputted to the two-port RAM 230. Moreover, the data signal DO (15:0) that is outputted by the two-port RAM 230 is outputted to the output control section 140.

The control signal generating section 300 outputs the address signal SAAD ((14:0)), the data signals SADA (15:0) and SBAS ((14:0)), the clock signals SACK and SBCK, the write enable signal SAWE and the inhibit signals SAIH and SBIH.

Further, the control signal generating section 300 will be described with reference to FIG. 11. The control signal generating section 300 includes an address decoder 301 that are identical with that in the second embodiment, and an inverter 302. In the address decoder 301 of those components, the chip select signal CSX is inputted to an enable terminal EN, and the address signal SAAD (14:0) is inputted to an address input terminal AIN, respectively, and those signals are decoded. Their outputs are outputted to the inhibit signal SAIH. Also, in the inverter 302, an inversion signal of the read control signal RDX is outputted to the clock signal SBCK. In addition, the address signals SAAD ((14:0)), SBAD ((14:0)), the data signal SADA (15:0) and the inhibit signal SBIH are through-output of the address signal EAD ((14:0)), the data signal EDI (15:0) and the chip select signal CSX from the main system 2, respectively. Also, the write enable signal SAWE outputs the low level.

In the data buffer circuit 30 according to the third embodiment, the two-port RAM 230 can be accessed from the main system 2 without using a specific method such as the data buffer circuit 10 of the first embodiment or the data buffer circuit 20 of the second embodiment. That is, in the data buffer circuit 30, the write enable signal SAWE, the clock signals SACK, SBCK, and the inhibit signals SAIH, SBIH are outputted from the data buffer circuit 30 according to the chip select signal CSX, and the read control signal RDX or the write control signal WRX from the main system 2.

In the read access, the trailing of the read control signal RDX is set as the leading (active edge) of the clock signal SBCK. Accordingly, the output of the data signal DO (15:0) of the two-port RAM 230 starts at the time of the trailing of the read control signal RDX. In the main system 2, because data of the data signal DO (15:0) is taken in at the time of the leading of the read control signal RDX, the read access is executed without any problem.

In the write access, the clock signal SACK is generated at the same timing as that of the data buffer circuit 10 in the first embodiment and the data buffer circuit 20 in the second embodiment. For that reason, the data EDI (15:0) that is outputted from the main system 2 is decided at the leading of the write control signal WRX. As a result, because the two-port RAM 230 can take in the decided data at the leading edge (termination edge) of the clock signal SACK, there arises no problem.

In the data buffer circuit 30 according to the third embodiment, the subsequent cycle address generating section 100 is omitted, and the control signal generating section 300 can be formed by a simple circuit structure as compared with the data buffer circuit 10 of the first embodiment and the data buffer circuit 20 of the second embodiment.

Also, the address initialization command CMA is issued, and an address is designated with respect to the RAM in the data buffer circuit 10 of the first embodiment and the data buffer circuit 20 of the second embodiment. On the other hand, the data buffer circuit 30 can directly designate the address of the two-port RAM 230. For that reason, particularly in the case where the read access and the write access are alternately executed, or in the case where an access is conducted at non-serial addresses, the data can be transferred with the more reduced number of access cycles.

The present invention is not limited to the above embodiments, but it is needless to say that various improvements or modifications can be conducted within a scope of the subject matter of the present invention.

For example, in the first to third embodiments, the clock generating circuit and the delay circuit which are made up of the MOS transistors were described. However, the present invention is not limited to this structure, but can be applied to various circuits that are made up of bipolar transistors.

Also, in the first to third embodiment, there was described a circuit using a signal of a negative logic which provides the low level as the active state for the write control signal and the read control signal. However, the present invention is not limited to this structure, but can be applied to a circuit using a signal of a positive logic which sets the high level as the active state for those control signals, likewise.

Further, in the first embodiment and the second embodiment, the subsequent address is derived from arithmetic operation that adds 1 to the present address, but a means for deriving the subsequent address is not limited. For example, as the means for deriving the subsequent address, other arithmetic operation such that 2 is added to the present address, or 1 is subtracted from the present address may be employed, or a lookup table that defines the access order of the addresses may be employed without using the arithmetic operation of the present address.

What is claimed is:

1. An interface circuit that is interposed between a synchronous circuit that conducts a data access in synchronization with an active edge of a clock signal and an asynchronous circuit that conducts a read access or a write access in an active period of a read control signal or a write control signal, and controls the synchronous circuit according to the read control signal or the write control signal outputted from the asynchronous circuit, the interface circuit comprising:

a clock signal generating section that generates the clock signal having termination edges of the respective active periods in the read control signal and the write control signal as the active edges;

a subsequent cycle address generating section that generates a present cycle address that is an address corresponding to the access from the asynchronous circuit, and a subsequent cycle address that is an address of a subsequent access cycle of the present cycle address in sequential access cycles to the synchronous circuit; and a first address selecting section that selects any one of the subsequent cycle address and the present cycle address according to a command from the asynchronous circuit as an address of the synchronous circuit, wherein the first address selecting section selectively outputs the present cycle address when the access to the synchronous circuit is the write access, and selectively outputs the subsequent cycle address when the access to the synchronous circuit is the read access.

2. The interface circuit according to claim 1, wherein the subsequent cycle address generating section includes a subsequent cycle address calculating section that inputs the present cycle address, and calculates the subsequent cycle address; a second address selecting section that selectively outputs an initial address instead of the subsequent cycle address according to an initialization command from the asynchronous circuit; and an address holding section that updates a held address to the output contents of the second address selecting section according to the write access or the read access to the synchronous circuit, and sets the held output as the present cycle address.

3. The interface circuit according to claim 2, wherein in the second address selecting section, the initialization command from the asynchronous circuit includes at least a part of the address signal which is outputted from the asynchronous circuit.

4. The interface circuit according to claim 2, wherein in the second address selecting section, the initialization command from the asynchronous circuit is made up of at least a part of the address signal which is outputted from the asynchronous circuit, and the write control signal.

5. The interface circuit according to claim 2, wherein the second address selecting section takes in the data signal from the asynchronous circuit as the initial address in the case where the initialization command is issued from the asynchronous circuit.

6. The interface circuit according to claim 2, wherein the subsequent cycle address generating section includes an address update suppressing section that suppresses the update of the address holding section according to a monitor command, and a present address output control section that controls the output of the present cycle address.

7. The interface circuit according to claim 6, wherein in the second address selecting section, the initialization command from the asynchronous circuit includes at least a part of the address signal outputted from the asynchronous circuit.

8. The interface circuit according to claim 6, wherein in the second address selecting section, the initialization command from the asynchronous circuit is made up of at least a part of the address signal outputted from the asynchronous circuit, and the read control signal.

9. The interface circuit according to claim 1, further comprising a write enable signal generating section that generates a write enable signal with respect to the synchronous circuit according to a write command from the asynchronous circuit.

10. A data buffer circuit which is interposed between a synchronous circuit and an asynchronous circuit that conducts a read access or a write access in an active period of a read control signal or a write control signal, and buffers data transfer between the synchronous circuit and the asynchronous circuit, the data buffer circuit comprising:

an interface circuit that inputs the read control signal and the write control signal of the asynchronous circuit and outputs a clock signal in response to the read control signal and the write control signal; and a synchronous memory circuit that conducts a data access with respect to the synchronous circuit in synchronization and conducts the data access with respect to the asynchronous circuit in synchronization with a clock signal outputted from the interface circuit, wherein the interface circuit includes a clock signal generating section that generates the clock signal with the termination edges of the respective active periods in the read control signal and the write control signal as the active edges, a subsequent cycle address generating section that generates a present cycle address which is an address corresponding to an access from the asynchronous circuit and a subsequent cycle address which is an address of a subsequent access cycle of the present cycle address in the continuous access cycles to the synchronous circuit, and a first address selecting section that selects any one of the subsequent cycle address and the present cycle address as an address of the synchronous memory circuit according to a command from the asynchronous circuit, and wherein the first address selecting section selectively outputs the present cycle address when the access to the synchronous memory circuit is the write access, and selectively outputs the subsequent cycle address when the access to the synchronous memory circuit is the read access.

11. A data buffer circuit which is interposed between a synchronous circuit and an asynchronous circuit that conducts a read access or a write access in an active period of a read control signal or a write control signal, and buffers data transfer between the synchronous circuit and the asynchronous circuit, the data buffer circuit comprising:

an interface circuit that inputs the read control signal and the write control signal of the asynchronous circuit and outputs a clock signal in response to the read control signal and the write control signal; and a synchronous memory circuit that conducts a data access with respect to the synchronous circuit in synchronization and conducts the data access with respect to the asynchronous circuit in synchronization with a clock signal outputted from the interface circuit, wherein the synchronous memory circuit comprises a synchronous dual port memory circuit having a write address input terminal used in the write access and a read address input terminal used in the read access, individually, wherein the interface circuit includes a clock signal generating section that generates the clock signal with the termination edges of the respective active periods in the read control signal and the write control signal as the active edges and a subsequent cycle address generating section that generates a present cycle address which is an address corresponding to an access from the asynchronous circuit and a subsequent cycle address which is an address of a subsequent access cycle of the present cycle address in the continuous access cycles to the synchronous circuit, and wherein the synchronous dual port memory circuit inputs the present cycle address from the write address input terminal, and inputs the subsequent cycle address from the read address input terminal.

12. A method of controlling an interface circuit that is interposed between a synchronous circuit that conducts a data access in synchronization with an active edge of a clock signal and an asynchronous circuit that conducts a read access or a write access in an active period of a read control signal or a write control signal, and controls the synchronous circuit according to the read control signal or the write control signal outputted from the asynchronous circuit, the method comprising the steps of:

generating the clock signal having termination edges of the respective active periods in the read control signal and the write control signal as the active edges;

generating a present cycle address that is an address corresponding to the access from the asynchronous circuit, and a subsequent cycle address that is an address of a subsequent access cycle of the present cycle address in sequential access cycles to the synchronous circuit; and selecting any one of the subsequent cycle address and the present cycle address according to a command from the asynchronous circuit as an address of the synchronous circuit, wherein the step of selecting the address of the synchronous circuit selectively outputs the present cycle address when the access to the synchronous circuit is the write access, and selectively outputs the subsequent cycle address when the access to the synchronous circuit is the read access.

13. The method of controlling an interface circuit according to claim 12, wherein the step of generating the present cycle address and the subsequent cycle address comprises the steps of:

inputting the present cycle address and calculating the subsequent cycle address;

selecting any one of the subsequent cycle address and an initial address as an update address according to a command from the asynchronous circuit; and updating the update address according to the write access or the read access, and setting a held output as the present cycle address.

14. The method of controlling an interface circuit according to claim 13, wherein in the step of selecting the update address, a command from the asynchronous circuit comprises a signal using at least a part of the address signal which is outputted from the asynchronous circuit.

15. The method of controlling an interface circuit according to claim 13, wherein in the step of selecting the update address, in the case where the command is issued from the asynchronous circuit, the data signal from the asynchronous circuit is set as the initial address.

16. The method of controlling an interface circuit according to claim 13, wherein in the step of selecting the update address, in the case where the command is issued from the asynchronous circuit, in the read access, the contents of the present cycle address are outputted to the data signal of the asynchronous circuit, and an address holding section continuously holds the present cycle address.

17. The method of controlling an interface circuit according to claim 13, further comprising the step of generating a write enable signal of the synchronous circuit according to a command from the asynchronous circuit.

\* \* \* \* \*